United States Patent
Era et al.

(10) Patent No.: US 9,296,057 B2
(45) Date of Patent: Mar. 29, 2016

(54) WELDING DEVICE AND CARBON DIOXIDE GAS SHIELDED ARC WELDING METHOD

(75) Inventors: Tetsuo Era, Osaka (JP); Akihiro Ide, Osaka (JP); Futoshi Nishisaka, Osaka (JP)

(73) Assignee: Daihen Corporation, Osaka (JP)

( * ) Notice: Subject to any disclaimer, the term of this patent is extended or adjusted under 35 U.S.C. 154(b) by 810 days.

(21) Appl. No.: 13/360,111

(22) Filed: Jan. 27, 2012

(65) Prior Publication Data
US 2012/0199560 A1 Aug. 9, 2012

(30) Foreign Application Priority Data
Feb. 7, 2011 (JP) ................................. 2011-023957

(51) Int. Cl.
  B23K 9/00 (2006.01)
  B23K 9/073 (2006.01)
  B23K 9/09 (2006.01)
  B23K 9/095 (2006.01)
  (Continued)

(52) U.S. Cl.
  CPC ................. B23K 9/0731 (2013.01); B23K 9/09 (2013.01); B23K 9/095 (2013.01); B23K 9/164 (2013.01); B23K 9/173 (2013.01)

(58) Field of Classification Search
  CPC .......... B23K 9/0731; B23K 9/09; B23K 9/08; B23K 9/093; B23K 9/095; B23K 9/164; B23K 9/173; B23K 9/1043; B23K 9/073
  USPC ......... 219/74, 130.31, 130.32, 130.33, 130.4, 219/130.5, 130.51, 137 PS
  See application file for complete search history.

(56) References Cited

U.S. PATENT DOCUMENTS

| 5,866,873 A * | 2/1999 | Wang et al. ............... 219/130.51 |
| 7,767,933 B2 * | 8/2010 | Matus et al. ................ 219/130.1 |
| 2002/0008095 A1 * | 1/2002 | Norrish et al. .......... 219/137 PS |

(Continued)

FOREIGN PATENT DOCUMENTS

| JP | 60-108179 A | 6/1985 |
| JP | 1299769 | * 12/1989 |

(Continued)

OTHER PUBLICATIONS

Patent Abstracts of Japan, Publication No. 60-108179, dated Jun. 13, 1985, 1 page.

(Continued)

*Primary Examiner* — Dana Ross
*Assistant Examiner* — Joseph Iskra
(74) *Attorney, Agent, or Firm* — Osha Liang LLP

(57) ABSTRACT

A welding device includes a power supply circuit for applying a voltage across a torch and a base metal, and a power supply control device. The power supply control device controls the power supply circuit such that a high level current is output during a first arc period Ta1 that is the initial period of an arc period, and an arc current corresponding to a regulated welding voltage is output during a second arc period Ta2 that is the latter period of the arc period. The power supply control device controls the power supply circuit such that a high level current is generated having a waveform increasing and decreasing at a constant frequency and constant amplitude superimposed on the high level current. By superimposing the waveform, the elevation of a droplet caused by an repelled force by the arc can be prevented, allowing a droplet to be formed in stabilization.

8 Claims, 7 Drawing Sheets

(51) Int. Cl.
B23K 9/16 (2006.01)
B23K 9/173 (2006.01)

(56) References Cited

U.S. PATENT DOCUMENTS

| | | | |
|---|---|---|---|
| 2003/0042238 A1* | 3/2003 | Koga et al. | 219/137 PS |
| 2007/0102409 A1 | 5/2007 | Koshiishi et al. | |
| 2007/0210048 A1 | 9/2007 | Koshiishi et al. | |
| 2009/0242533 A1* | 10/2009 | Yamazaki et al. | 219/130.32 |
| 2010/0193486 A1* | 8/2010 | Hirota et al. | 219/125.1 |
| 2011/0226749 A1 | 9/2011 | Sato et al. | |
| 2012/0111842 A1 | 5/2012 | Fujiwara et al. | |
| 2012/0145691 A1 | 6/2012 | Fujiwara et al. | |

FOREIGN PATENT DOCUMENTS

| | | | |
|---|---|---|---|
| JP | H01-299769 A | | 12/1989 |
| JP | 2-059176 A | | 2/1990 |
| JP | 7-047473 A | | 2/1995 |
| JP | 7-290241 A | | 11/1995 |
| JP | 8-318375 A | | 12/1996 |
| JP | 9-182961 A | | 7/1997 |
| JP | 2001-129668 A | | 5/2001 |
| JP | 2001129668 | * | 5/2001 |
| JP | 2003-236668 A | | 8/2003 |
| JP | 2007-130647 A | | 5/2007 |
| JP | 2007-237270 A | | 9/2007 |
| JP | 5170315 B2 | | 3/2013 |
| JP | 5278542 B2 | | 9/2013 |
| WO | 2011013321 A1 | | 2/2011 |
| WO | WO2011013321 | * | 2/2011 |

OTHER PUBLICATIONS

Patent Abstracts of Japan, Publication No. 9-182961, dated Jul. 15, 1997, 1 page.
Patent Abstracts of Japan, Publication No. 2-059176, dated Feb. 28, 1990, 1 page.
Patent Abstracts of Japan, Publication No. 7-047473, dated Feb. 21, 1995, 1 page.
Patent Abstracts of Japan, Publication No. 7-290241, dated Nov. 7, 1995, 1 page.
Patent Abstracts of Japan, Publication No. 8-318375, dated Dec. 3, 1996, 1 page.
Patent Abstracts of Japan, Publication No. 2001-129668, dated May 15, 2001, 1 page.
Patent Abstracts of Japan, Publication No. 2003-236668, dated Aug. 26, 2003, 1 page.
Patent Abstracts of Japan, Publication No. 2007-130647, dated May 31, 2007, 1 page.
Patent Abstracts of Japan, Publication No. 2007-237270, dated Sep. 20, 2007, 1 page.
Office Action issued in corresponding Japanese Application No. 2011-023957, mailed Jan. 13, 2015 (4 pages).
Decision to Grant a Patent issued in corresponding Japanese Application No. 2011-023957, mailed Aug. 4, 2015 (6 pages).

* cited by examiner t=Pb t=Pc t=Pd

WELDING DEVICE AND CARBON DIOXIDE GAS SHIELDED ARC WELDING METHOD

BACKGROUND OF THE INVENTION

1. Field of the Invention

The present invention relates to a welding device and a carbon dioxide gas shielded arc welding method.

2. Description of the Background Art

Japanese Patent Laying-Open No. 60-108179 (Patent Literature 1) discloses a consumable electrode type arc welding method repeating short circuiting and arcing between the consumable electrode and the base metal. In this consumable electrode arc welding method, the step of forming a droplet and the step of transferring the droplet to the base metal are repeated.

FIG. 9 is a diagram to describe a consumable electrode type arc welding method repeating short circuiting and arcing.

Referring to FIG. 9, in a consumable electrode type arc welding method repeating short circuiting and arcing, the steps of (a)-(f) that will be described hereinafter are sequentially executed repeatedly. (a) A short circuit initial state in which a droplet forms contact with a molten pool; (b) a short circuit middle state in which the contact between the droplet and the molten pool is definite such that the droplet is transferring towards the molten pool; (c) a short circuit latter state in which the droplet is transferred to the molten pool side with a constriction between the weld wire and molten pool; (d) the short circuit is broken and an arc is generated; (e) an arcing state in which the tip of the welding wire melts to form the droplet; and (f) an arcing state in which the droplet grows, immediately before short circuiting with the molten pool.

In the conventional short circuiting transfer welding disclosed in Japanese Patent Laying-Open No. 60-108179, arcing and short circuiting occur on a regular basis. However, according to globular transfer associated with short circuiting in the case where welding is performed by a carbon dioxide gas shielded arc welding method at a high current (>200 A), a droplet will be elevated to the upper portion of the wire by the repelled force by the arc, increasing the arcing time. It will become difficult to cause short circuit periodically, and the arcing and short circuiting will occur irregularly.

Such an irregular change of the short circuit period and arc period will cause an indefinite droplet size at the time of short circuiting, leading to an irregular bead shape.

Furthermore, since a high current will cause excessive repelled force by the arc at a random position relative to the molten pool, the molten pool will be vibrated greatly and irregularly. A humping bead is readily generated by the pushing of the molten pool in a direction opposite to the welding position.

Particularly, there is a demand for increasing the welding speed (>1 m/s) in order to improve the productivity. Degradation in the welding quality affected by the above-described problem will become noticeable in high-speed welding.

SUMMARY OF THE INVENTION

An object of the present invention is to provide a welding device and a carbon dioxide gas shielded arc welding method that allows a droplet to be formed stably.

The present invention is directed to a welding device performing welding by a carbon dioxide gas shielded arc welding method repeating a short circuit state and an arc state alternately, using carbon dioxide gas as shielding gas. The welding device includes a power supply circuit applying a voltage across a torch and a base metal, and a control unit controlling the voltage of the power supply circuit. The control unit controls the power supply circuit such that a high level current is output during a first arc period that is the initial period of the arc period subsequent to a short circuit period, and an arc current corresponding to a regulated welding voltage is output during a second arc period that is the latter period of the arc period. The control unit controls the power supply circuit such that a high level current is generated having a waveform increasing and decreasing at a constant frequency and constant amplitude superimposed on the high level current.

Preferably, the waveform increasing and decreasing at constant amplitude is a triangle wave or a sine wave.

Preferably, the control unit carries out control so as to reduce a short circuit current when a constriction of a droplet is detected during a short circuit period.

The present invention according to another aspect is directed to a carbon dioxide gas shielded arc welding method in which a short circuit state and an arc state are repeated alternately, using carbon dioxide gas as shielding gas. The method includes the steps of outputting a high level current during a first arc period that is the initial period of the arc period subsequent to a short circuit period, and outputting an arc current corresponding to a regulated welding voltage during a second arc period that is the latter period of the arc period. In the step of outputting a high level current, the high level current is generated having a waveform increasing and decreasing at a constant frequency and constant amplitude superimposed on the high level current.

Preferably, the waveform is a triangle wave or sine wave.

Preferably, in the step of causing a short circuit state, a constriction detection control of reducing the short circuit current is performed when a constriction of a droplet is detected during the short circuit period.

According to the present invention, elevation of the droplet caused by the repelled force by the arc is prevented to allow a droplet to be formed stably. Accordingly, the quality of welding can be improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
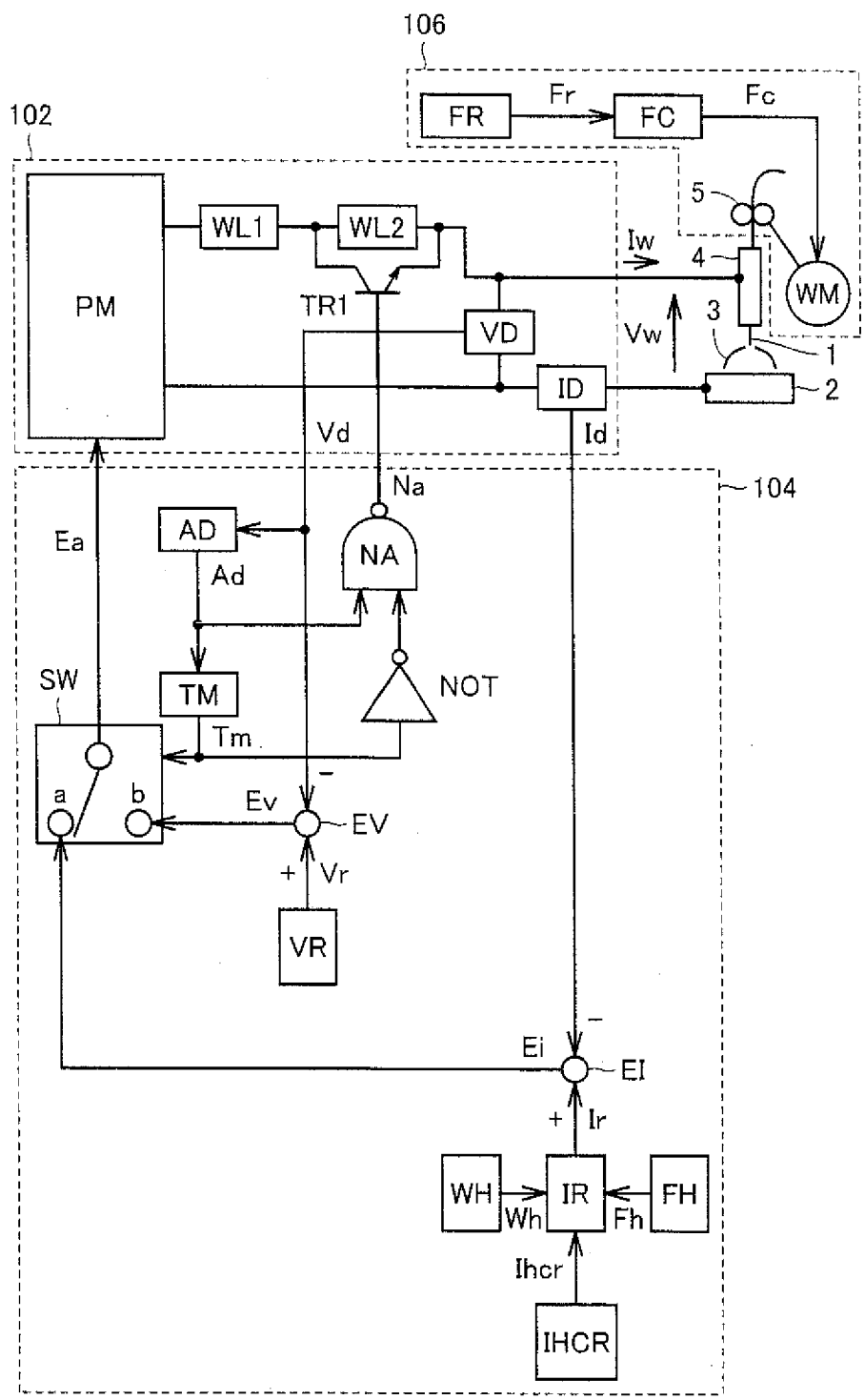
FIG. 1 is a block diagram of a welding device according to a first embodiment.

Embodiments of the present invention will be described in detail hereinafter with reference to the drawings. In the drawings, the same or corresponding elements have the same reference characters allotted, and description thereof will not be repeated.

The welding method described in the present embodiment corresponds to a welding method in which a short circuit state and an arc state are repeated, differing from the pulse arc welding method.

First Embodiment

FIG. 1 is block diagram of a welding device 100 according to a first embodiment of the present invention.

Referring to FIG. 1, welding device 100 includes a power supply circuit 102, a power supply control device 104, a wire feed device 106, and a welding torch 4.

Power supply control device 104 controls power supply circuit 102 such that a welding current Iw and a welding voltage Vw output to welding torch 4 attain values appropriately for welding.

Wire feed device 106 feeds a welding wire 1 to welding torch 4. Although not shown, shielding gas with carbon dioxide gas as the main component is emitted from the tip of welding torch 4. An arc 3 is generated between welding wire 1 protruding from the tip of welding torch 4 and a base metal 2 to cause welding wire 1 to melt to weld base metal 2. Wire feed device 106 includes a feeding speed setting circuit FR, a feed control circuit FC, a feed motor WM, and a feed roll 5.

Power supply circuit 102 includes a power supply main circuit PM, reactors WL1 and WL2, a transistor TR1, a voltage detection circuit VD, and a current detection circuit ID.

Power supply main circuit PM receives commercial power supply (not shown) of 3-phase 200V or higher or the like as the input to control the output through inverter control according to an error amplification signal Ea that will be described afterwards to output a welding current Iw and a welding voltage Vw suitable for arc welding. Although not shown, power supply main circuit PM includes, for example, a primary rectifier rectifying the commercial power supply, a capacitor smoothing the rectified direct-current voltage, an inverter circuit converting the smoothed direct-current voltage into high frequency alternating-current voltage, a high frequency transformer down-converting the high frequency alternating-current voltage to a level of a voltage suitable for arc welding, a secondary rectifier rectifying the down-converted high frequency alternating-current voltage, and a drive circuit performing pulse width modulation control with error amplification signal Ea as an input to drive the inverter circuit based on the result.

Reactors WL1 and WL2 smooth the output current from power supply main circuit PM. Reactor WL2 is connected parallel to transistor TR1. Transistor TR1 is OFF only during a second arc period Ta2 according to a NAND logic signal Na that attains a low level in the second arc period Ta2 that will be described with reference to FIG. 2.

Feeding speed setting circuit FR outputs a feeding speed setting signal Fr corresponding to a predetermined setting value of steady feeding speed. Feed control circuit FC outputs to feed motor WM a feed control signal Fc to feed welding wire 1 at a feeding speed corresponding to the value of feeding speed setting signal Fr. Welding wire 1 is fed passing through the interior of welding torch 4 through the rotation of feed roll 5 of wire feed device 106 to cause igniting the arc 3 between welding wire 1 and base metal 2.

Current detection circuit ID detects welding current Iw to output a welding current detection signal Id. Voltage detection circuit VD detects welding voltage Vw to output a welding voltage detection signal Vd.

Power supply control device 104 includes an arc detection circuit AD, a timer circuit TM, a NAND circuit NA, an inverter circuit NOT, an amplitude center current setting circuit IHCR, a frequency setting circuit FH, an amplitude setting circuit WH, a welding current setting circuit IR, a current error amplification circuit EI, a welding voltage setting circuit VR, a voltage error amplification circuit EV, and an external characteristic switching circuit SW.

Arc detection circuit AD receives a welding voltage detection signal Vd to output an arc detection signal Ad attaining a high (H) level upon determination of arcing in response to the voltage of welding voltage detection signal Vd becoming greater than or equal to a threshold value. Timer circuit TM receives an arc detection signal Ad to output a timer signal Tm attaining a high level during a period where arc detection signal Ad is at a low (L) level, and for a predetermined period after arc detection signal Ad attains a high level. NAND circuit NA receives a signal that is an inverted version of timer signal Tm by inverter circuit NOT, and arc detection signal Ad as inputs to output a NAND logic signal Na.

Amplitude center current setting circuit IHCR outputs an amplitude center current setting signal Ihcr corresponding to a predetermined high level current. Frequency setting circuit FH outputs a predetermined frequency setting signal Fh. Amplitude setting circuit WH outputs a predetermined amplitude setting signal Wh. Welding current setting circuit IR outputs a welding current setting signal Ir based on the inputs of amplitude center current setting signal Ihcr, frequency setting signal Fh, and amplitude setting signal Wh. Current error amplification circuit EI amplifies the difference between welding current setting signal Ir and welding current detection signal Id to output a current error amplification signal Ei.

Welding voltage setting circuit VR outputs a predetermined welding voltage setting signal Vr. Voltage error amplification circuit EV amplifies the difference between welding voltage setting signal Vr and welding voltage detection signal Vd to output a voltage error amplification signal Ev.

External characteristic switching circuit SW receives timer signal Tm, current error amplification signal Ei, and voltage error amplification signal Ev as the inputs.

External characteristic switching circuit SW switches the input side to an input terminal "a" when timer signal Tm is at a high level to output current error amplification signal Ei as error amplification signal Ea. At this stage, constant current control is effected since the current error is fed back to power supply main circuit PM.

External characteristic switching circuit SW switches the input side to an input terminal "b" when timer signal Tm is at a low level to output voltage error amplification signal Ev as error amplification signal Ea. By these blocks, welding current Iw is regulated. At this stage, constant voltage control is effected since the voltage error is fed back to power supply main circuit PM.

Figure 2:
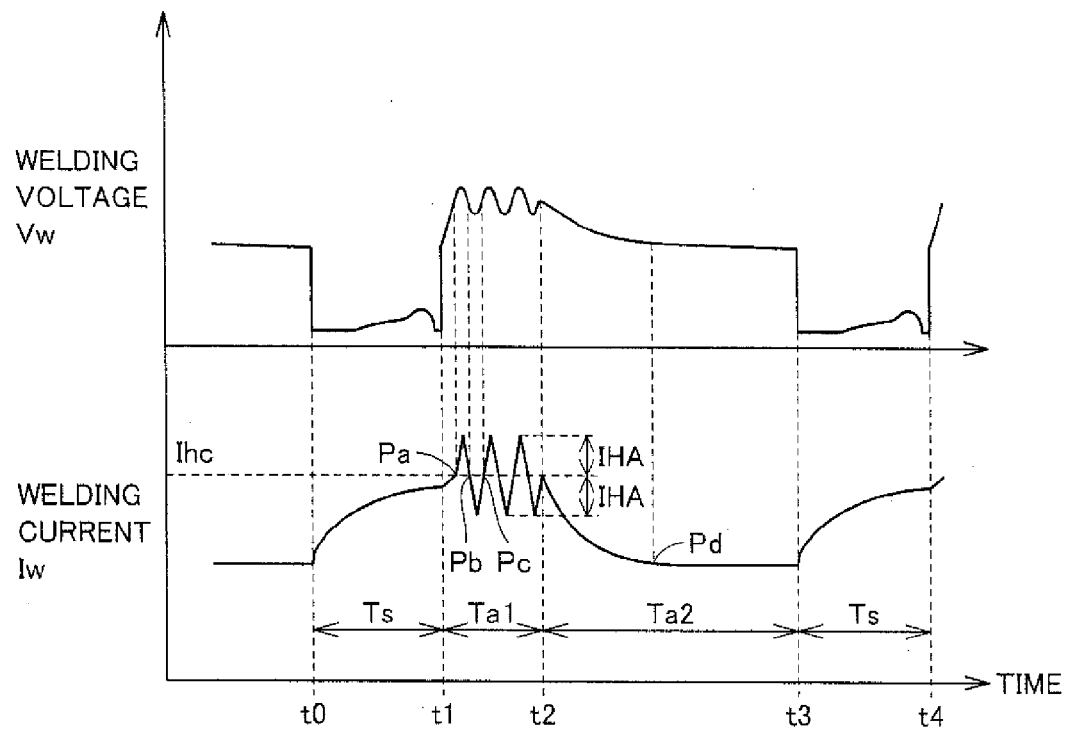
FIG. 2 is an operation waveform diagram of a welding voltage and a welding current during welding with the welding device of the first embodiment.

FIG. 2 is an operation waveform diagram of a welding voltage and welding current in carrying out welding with the welding device of the first embodiment.

Referring to FIGS. 1 and 2, welding proceeds by a repetition of a short circuit period Ts and an arc period. The arc period is divided into the initial first arc period Ta1 and the latter second arc period Ta2.

During short circuit period Ts of time t0-t1, welding wire 1 forms contact with base metal 2 to cause a flow of short circuit current, whereby Joule heat is generated at the tip of welding wire 1 such that the tip of welding wire 1 attains high temperature.

When the droplet at the tip of welding wire 1 is transferred to cause arcing at time t1, power supply control device 104 determines the igniting the arc according to the sudden increase of the welding voltage. In response, power supply control device 104 switches the control to constant current control, and proceeds to first arc period Ta1 The welding current rises up to a high level current IH. Thereafter, high level current IH flows for a constant period as the Welding current. This high level current IH is suppressed to a level that does not cause elevation of the droplet by the repelled force by the arc. At this stage, it is desirable to increase welding speed Vm even if only slightly in order to improve the production efficiency. The welding current flowing during this first arc period Ta1 is called "high level current".

The melting rate Vm of the welding wire is represented by $Vm = \alpha I + \beta I^2 R$, where $\alpha$, $\beta$ represent coefficients, I the welding current, and R the resistance of the portion of the welding wire protruding from the contact tip of the torch end (poke-out length). It is appreciated that melting rate Vm of the welding wire becomes higher as welding current I is increased.

It is to be noted that increase in a welding current I causes increase of the repelled force by the arc upward towards a droplet. The repelled force by the arc is proportional to the square of welding current I. There is also the gravity force acting on the droplet. Based on the border of current value where the gravity force and repelled force by the arc are exactly in balance, upward force will act if the current value is large and downward force will act if the current value is small. By superimposing welding current I with the alternating current, an upward force and downward force will act alternately on the droplet. The inventors of the present invention found out that exerting upward force and downward force alternately on the droplet by increasing and decreasing the current provided a more stable droplet than exerting upward force continuously on the droplet by globally increasing the current, allowing reduction in the spatter. The present embodiment is directed to totaling a droplet stably and in a stepwise manner by increasing and decreasing the current during the first arc period.

During the first arc period of time t1-t2, a triangle wave that will be described hereinafter is superimposed on amplitude center current Ihc.

The triangle wave is centered about an amplitude center current Ihc (200 to 400 A), at the frequency of 2.5 kHz to 5 kHz and an amplitude of +−50 to 100 A, in first arc period Ta1 of 1 ms to 1.5 ms. For example, the superimposing triangle wave may be set for 4 cycles at amplitude center current of Ihc=400 A, the amplitude of IHA=+−100 A, the frequency of f=4 kHz, in the first arc period of Ta1=1.0 ms. The superimposing waveform is not limited to a triangle wave, and another type of waveform such as a sine wave may be employed.

The state of the welding portion in first arc period Ta1 will be described in detail hereinafter.

(1) 0 to ½ cycle of triangle wave

Figure 3:
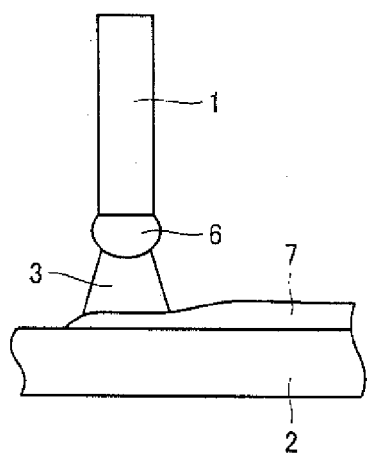
FIG. 3 represents the state of a welding portion at point Pa in FIG. 2.

FIG. 3 represents the state of the welding portion at point Pa of FIG. 2. Point Pa is where superimposing of the triangle wave is initiated.

Referring to FIG. 3, an arc 3 is generated between the tip of welding wire 1 and base metal 2. The heat by arc 3 causes the tip of welding wire 1 to be heated to cause the end to melt, whereby a droplet 6 is formed. Welding wire 1 is fed towards base metal 2 by a feeding device.

The wire melting rate is raised by the superimposed current to increase the size of the droplet. The force exerted on the droplet becomes maximum at the ¼ cycle, accelerating the elevation of the droplet by the repelled force by the arc. However, as the current becomes lower towards the ½ cycle, the repelled force by the arc is also reduced, preventing the elevation.

Figure 4:
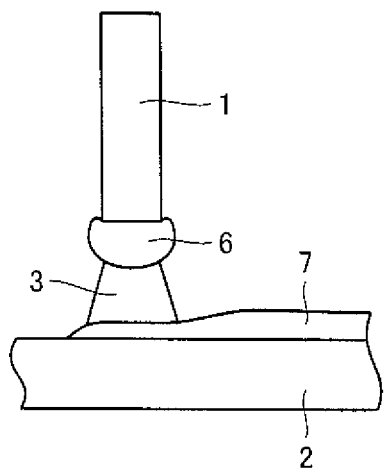
FIG. 4 represents the state of a welding portion at point Pb in FIG. 2.

FIG. 4 represents the state of the welding portion at point Pb in FIG. 2. Point Pb corresponds to the elapse of the ½ cycle of the triangle wave. As shown in FIG. 4, droplet 6 at the tip of welding wire 1 slightly grows, attaining a slightly elevating state.

(2) ½ to ¾ cycle of triangle wave

During this period, the welding current becomes lower than amplitude center current Ihc by power supply control device 104, whereby the repelled force by the arc towards the droplet is further reduced.

(3) ¾ to 1 cycle of triangle wave

During the ¾ to 1 cycle of the triangle wave, the welding current is increased again from the lower side peak value of the triangle wave to amplitude center current Ihc.

Figure 5:
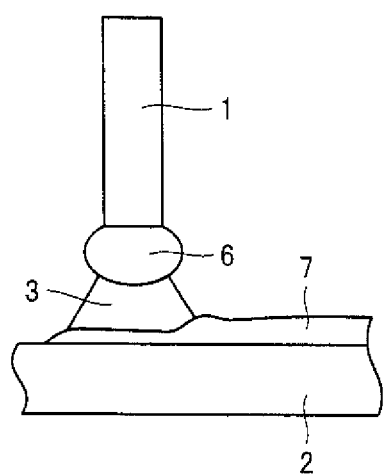
FIG. 5 represents the state of a welding portion at point Pc in FIG. 2.

FIG. 5 represents the state of the welding portion at point Pc in FIG. 2. Point Pc corresponds to the elapse of one cycle of the triangle wave. As shown in FIG. 5, the gravity force and repelled force by the arc acting on droplet 6 take an appropriate balance by the reduction of the repelled force by the arc. Accordingly, the elevation of droplet 6 is eliminated such that droplet 6 attains a sagging state.

Then, the triangle wave described at (1) to (3) is repeated 4 times to be superimposed on amplitude center current Ihc. Accordingly, the droplet gradually becomes larger while the elevation caused by the repelled force by the arc is prevented. Thus, a droplet of the desired size can be formed.

Inductance value WL1 in the first arc period Ta1 is set smaller than in the next second arc period Ta2 (inductance value is WL1+WL2) to facilitate the superimposing of the triangle wave.

The state of the welding portion in second arc period Ta2 will be described in detail hereinafter.

Referring to FIG. 2 again, first arc period Ta1 ends at time t2 to proceed to second arc period Ta2. In second arc period Ta2, power supply control device 104 increases the inductance value of power supply circuit 102 to switch control from constant current control to constant voltage control for arc length control. This switching corresponds to the switching of SW from terminal "a" to terminal "b". Since the inductance is great, the waveform of the welding current decreases gradually according to the arc load. Furthermore, the welding voltage also decreases gradually.

Figure 6:
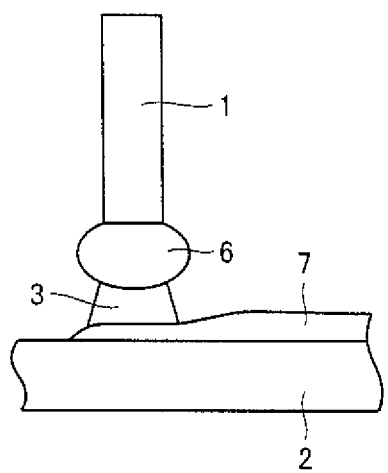
FIG. 6 represents the state of a welding portion at point Pd in FIG. 2.

FIG. 6 represents an example of a welding portion at point Pd of FIG. 2.

The droplet formed in first arc period Ta1 slightly increases in size in second arc period Ta2 without elevation, as shown in FIG. 6, coming closer to the molten pool. Since change in the arc length caused by elevation is prevented and the arc length is adjusted by constant voltage control, the change in the repelled force by the arc become gradual, so that vibration of the molten pool is small. Furthermore, since the welding current is reduced gradually, introduction of heat towards the base metal is sufficient, improving the affinity of the bead at the toe portion.

When the droplet forms contact with the molten pool to cause short circuiting at time t3, the droplet suddenly falls. Upon a determination of short circuiting by the abrupt drop of the welding voltage, the welding current is increased at the desired rising speed. The rise of the welding current causes the electromagnetic pinching force to act on the upper portion of the droplet to form a constriction, and droplet 6 is transferred to molten pool 7.

As mentioned above, the welding method of the first embodiment is a carbon dioxide gas shielded arc welding method performing low spatter control, differing from a pulse arc welding method.

In other words, the welding method of the first embodiment is a method that repeats a short circuit state and an arc state. According to the welding method, increase of the welding current to raise the welding speed causes welding at the globular transfer region, resulting in an irregular repetition of a short circuit state and an arc state.

In view of this issue, the welding method of the first embodiment provides the output of a high level current at a first arc period Ta1 of a constant term, performs constant current control in this first arc period Ta1, and superimposes an alternating current, for example, a low frequency current of a constant amplitude and constant frequency changing periodically such as a triangle wave or a sine wave. Thus, the elevation of a droplet caused by the repelled force by the arc is prevented, allowing stable formation of the droplet.

At the elapse of first arc period Ta1, control of the welding power supply is switched from constant current control to constant voltage control to effect arc length control in second arc period Ta2. The inductance value of the reactor of the welding power supply is set greater than that in the first arc period Ta1 to cause the welding current to be reduced gradually. Accordingly, the repelled force by the arc will vary gradually, reducing the vibration at the molten pool. Moreover, since the welding current is reduced further gradually, heat is sufficiently introduced towards the base metal, improving the affinity of the bead at the toe portion.

In order to set the inductance value of the reactor of the welding power supply in second arc period Ta2 greater than that in first arc period Ta1 according to the first embodiment, a reactor WL2 is actually inserted. Alternatively, the inductance value may be increased by electronic control of the reactor.

In short circuit period Ts in the first embodiment, the current may be raised to a desired value with the same constant voltage control, or by switching to constant current control.

Second Embodiment

The second embodiment is directed to lowering the current prior to arcing to reduce the spatter by detecting a constriction of the droplet prior to arcing, in addition to the welding method described in the first embodiment.

Figure 7:
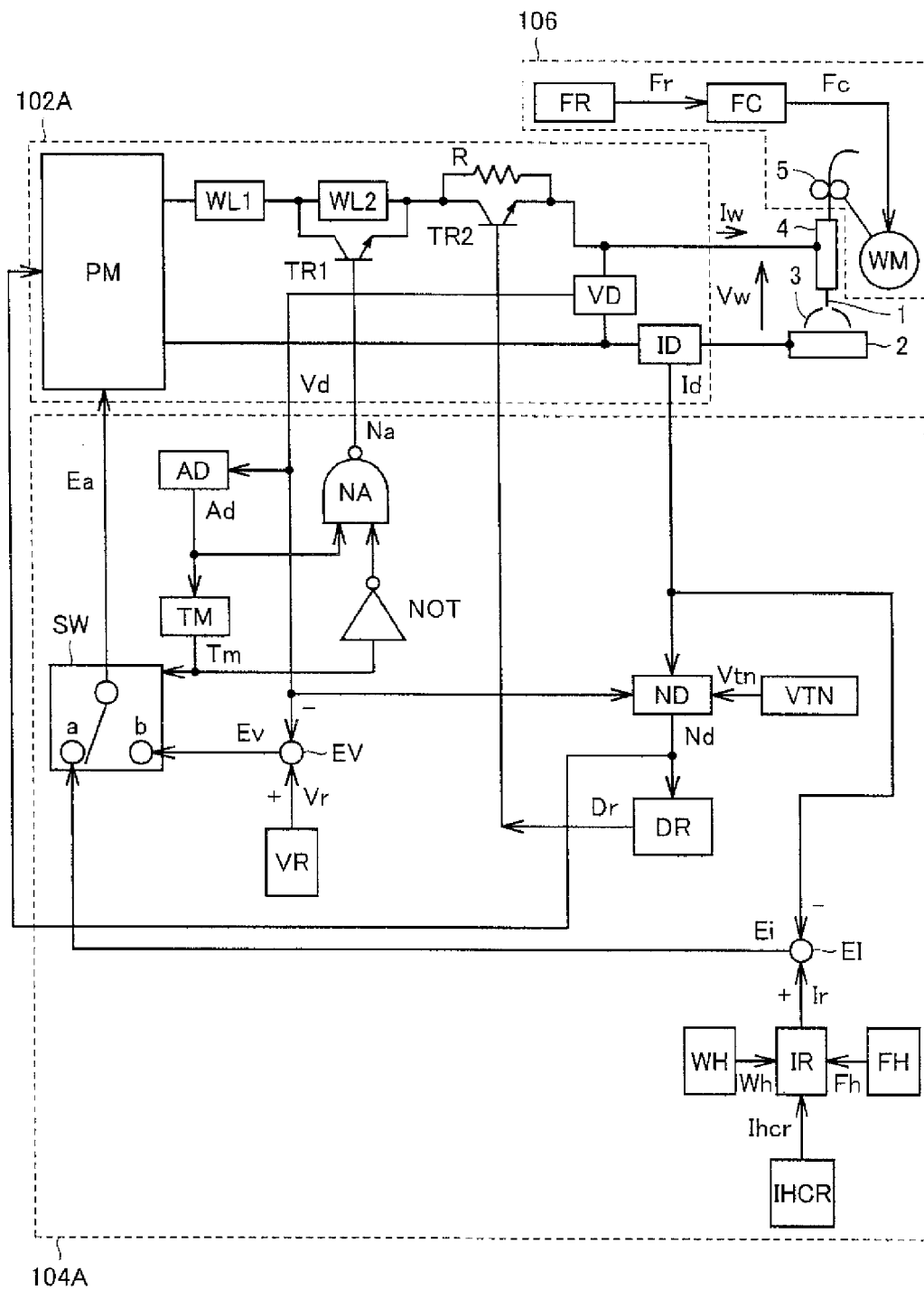
FIG. 7 is a block diagram of a configuration of a welding device 100A according to a second embodiment.

FIG. 7 is a block diagram of a configuration of a welding device 100A according to the second embodiment. Only elements differing from those of the first embodiment will be described hereinafter. Elements similar to those of the first embodiment have the same reference characters allotted, and description thereof will not be repeated.

Referring to FIG. 7, welding device 100A includes a power supply circuit 102A, a power supply control device 104A, a wire feed device 106, and a welding torch 4.

Welding device 100A includes, in addition to the configuration of welding device 100 shown in FIG. 1, a transistor TR2 and a current decreasing resistor R. Transistor TR2 is inserted at the output of power supply main circuit PM, in series with reactors WL1 and WL2. Current decreasing resistor R is connected parallel to transistor TR2. The configuration of the remaining elements in welding device 100A is similar to that of welding device 100.

Power supply circuit 102A includes, in addition to the configuration of power supply circuit 102 shown in FIG. 1, a constriction detection circuit ND, a constriction detection reference value setting circuit VTN, and a drive circuit DR. The configuration of the remaining elements in power supply circuit 102A is similar to that of power supply circuit 102.

Figure 8:
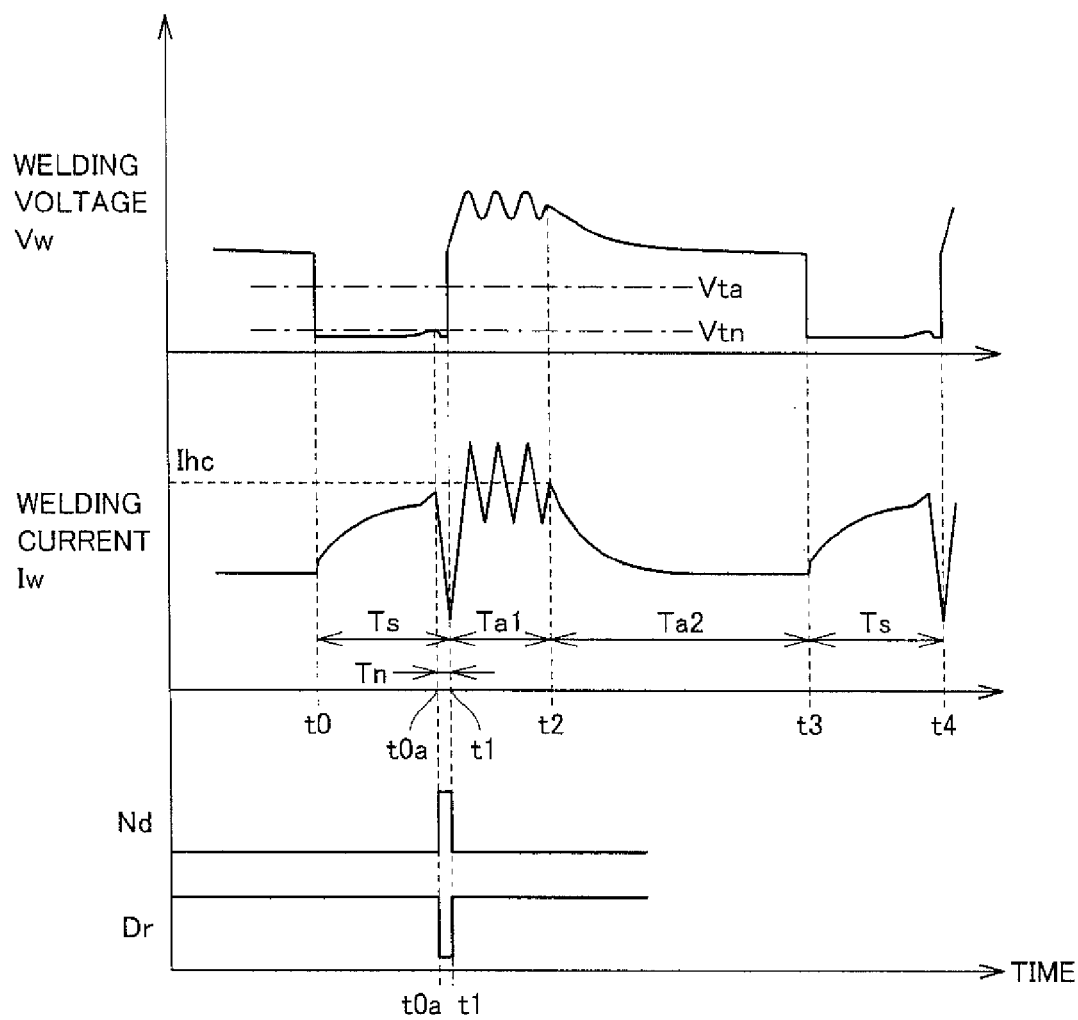
FIG. 8 is an operation waveform diagram of a welding voltage and a welding current as well as a control signal during welding with the welding device of the second embodiment.
Figure 9:
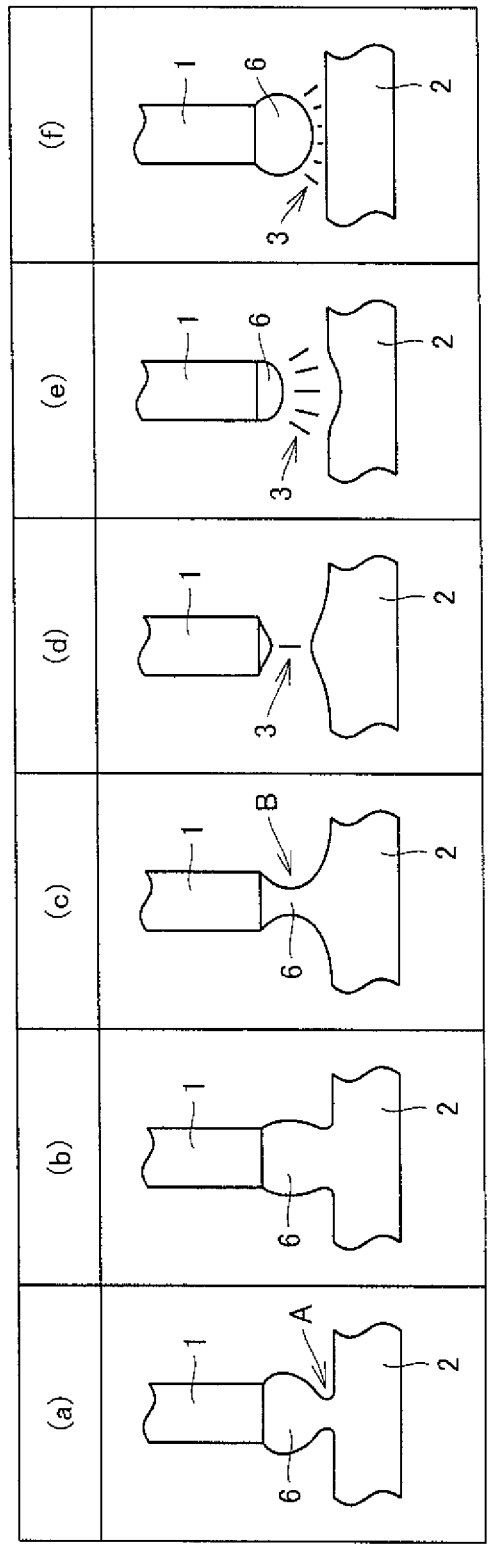
FIG. 9 is a diagram to describe a consumable electrode type arc welding method repeating short circuiting and arcing.

FIG. 8 is an operation waveform diagram of a welding voltage and welding current as well as a control signal in carrying out welding with the welding device of the second embodiment.

The waveform of FIG. 8 differs from that of the first embodiment shown in FIG. 2 in that the welding current is decreased upon detecting a constriction of the droplet at time t0a, and then an arc is generated at time t1.

Since the amount of spatter is proportional to the level of the current value when an arc is generated at time t1, the generation of spatter can be reduced by lowering the current value when an arc is generated.

Referring to FIGS. 7 and 8, constriction detection reference value setting circuit VTN outputs a predetermined constriction detection reference value signal Vtn. Constriction detection circuit ND is based on the inputs of constriction detection reference value signal Vtn, welding voltage detection signal Vd and welding current detection signal Id described with reference to FIG. 1 to output a constriction detection signal Nd that attains a high level at a point in time (time t0a) when a voltage increased value ΔV reaches the value of detection reference value signal Vtn during the short circuit period, and that attains a low level at a point in time (time t1) where arc ignites again and the value of welding voltage detection signal Vd becomes greater than or equal to an arc determination value Vta. Therefore, a high level period of constriction detection signal Nd corresponds to a constriction detection period Tn.

Constriction detection signal Nd may be made to attain a high level at the point in time where the derivative of welding voltage detection signal Vd in the short circuit period reaches the value of constriction detection reference value signal Vtn that has been set correspondingly. Further alternatively, the value of welding voltage detection signal Vd may be divided by the value of welding current detection signal Id to calculate a resistance value of the droplet, and cause constriction detection signal Nd to attain a high level at the point in time when the derivative of the calculated resistance value reaches the value of constriction detection reference value signal Vtn set correspondingly. Constriction detection signal Nd is applied to power supply main circuit PM. Power supply main circuit PM stops the output during constriction detection period Tn.

Drive circuit DR outputs a drive signal Dr that renders transistor TR2 ON when constriction detection signal Nd is at a low level (non-constriction detection mode). Since drive signal Dr is at a low level during constriction detection period Tn, transistor TR2 attains an OFF state. As a result, a current decreasing resistor R is inserted into the conducting path of welding current Iw (the path from power supply main circuit PM to welding torch 4). The value of this current decreasing resistor R is set to a value (approximately 0.5 to 3Ω) greater than or equal to 10 times the short circuit load (approximately, 0.01 to 0.03Ω). Accordingly, the energy accumulated in the direct current reactor in the welding power source and in the reactor of the cable is suddenly discharged. Welding current Iw is decreased suddenly to attain a small current value, as shown at time t0a-t1 in FIG. 8.

When the short circuit is broken to cause arcing again at time t1, welding voltage Vw becomes greater than or equal to a predetermined arc determination value Vta. In response to this detection, constriction detection signal Nd attains a low level and driving signal Dr attains a high level. As a result, transistor TR2 attains an ON state. Thereafter, arc welding control described in the first embodiment with reference to FIG. 2 is performed. The subsequent first arc period Ta1 and second arc period Ta2 have been already described with reference to FIG. 2.

Since the welding device of the second embodiment can have the current value reduced at the time when arc ignites again at the arc regeneration mode (time t1), the advantage of further reducing the spatter at the moment of arc igniting is achieved in addition to the advantage provided by the welding device described in the first embodiment.

The second embodiment has been described based on a method of inserting current decreasing resistor R into the conducting path as the means for reducing welding current Iw rapidly when a constriction is detected. As other means that may be employed, a capacitor can be connected in parallel across the output terminals of the welding device via a switching element, and set the switching element at an ON state upon detection of a constriction to cause a discharging current from the capacitor for rapid reduction of welding current Iw.

The first and second embodiments will be summarized hereinafter with reference to FIGS. 1, 7 and the like. Welding devices 100 and 100A are directed to welding according to a carbon dioxide gas shielded arc welding method repeating a short circuit state and an arc state alternately, using carbon dioxide gas as shielding gas Welding device 100 or 100A includes a power supply circuit 102 or 102A to provide a voltage across welding torch 4 and base metal 2, and power supply control device 104 or 104A controlling the voltage of power supply circuit 102. Power supply control device 104 or 104A controls power supply circuit 102 such that, as shown in FIGS. 2 and 8, a high level current is output during a first arc period Ta1 that is the initial period of the arc period subsequent to a short circuit period Ts, and an arc current corresponding to the regulated welding voltage is output during a second arc period Ta2 that is the latter period of the arc period. Power supply control device 104 controls power supply circuit 102 such that a waveform increasing and decreasing at a constant frequency and constant amplitude is superimposed on high level current IH to cause generation of a high level current.

Since a waveform that increases and decreases at constant amplitude is superimposed on a high level current, the repelled force by the arc is weakened to stabilize the manner of the droplet as compared to the case where the high level current is set higher than amplitude center current Ihc with no exception. Furthermore, the growing rate of the droplet can be increased as compared to the case where the high level current is set at the constant level of amplitude center current Ihc.

Preferably, the waveform increasing and decreasing at constant amplitude is, but not limited to, a triangle wave or a sine wave. Although another waveform may be employed, a triangle wave or a sine wave is preferable since the relevant waveform can be readily generated.

Preferably, power supply control device 104A performs constriction detection control in which the short circuit current is decreased abruptly when a constriction of a droplet is detected during the short circuit period. In combination with the constriction detection of a droplet, the behavior of a droplet is further stabilized, and spatter generation can be further reduced.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A welding device performing welding by a carbon dioxide gas shielded arc welding method repeating a short circuit state and an arc state alternately, using carbon dioxide gas as shielding gas, said welding device comprising:
   a power supply circuit applying a voltage across a torch and a base metal, and
   a control unit controlling the voltage of said power supply circuit,
   said control unit controlling said power supply circuit such that:
   a first current is output during a short circuit period where a droplet at the tip of the torch is formed to cause arcing, said arcing initiating a first arc period;
   a second current is output during the first arc period, wherein
   said second current is generated having a waveform increasing and decreasing at a constant frequency and constant amplitude superimposed on an amplitude center current, and
   a third current is output during a second arc period immediately following the first arc period, where the welding current decreases gradually according to an arc load, and
   the second arc period is followed by the short circuit period such that the short circuit state and the arc state are repeated alternately.

2. The welding device according to claim 1, wherein said waveform increasing and decreasing at constant amplitude is a triangle wave or a sine wave.

3. The welding device according to claim 2, wherein said control unit performs constriction detection control of reducing a short circuit current when a constriction of a droplet is detected during the short circuit period.

4. The welding device according to claim 1, wherein said control unit performs constriction detection control of reducing a short circuit current when a constriction of a droplet is detected during the short circuit period.

5. A carbon dioxide gas shielded arc welding method in which a short circuit state and an arc state are repeated alternately, using carbon dioxide gas as shielding gas, said method comprising the steps of:
   outputting a first current during a short circuit period where a droplet at the tip of the torch is formed to cause arcing, said arcing initiating a first arc period;
   outputting a second current during the first arc period, wherein
   the second current has a waveform increasing and decreasing at a constant frequency and constant amplitude superimposed on an amplitude center current,
   outputting a third current during a second arc period immediately following the first arc period, where the welding current decreases gradually according to an arc load, and
   the second arc period is followed by the short circuit period such that the short circuit state and the arc state are repeated alternately.

6. The carbon dioxide gas shielded arc welding method according to claim 5, wherein said waveform is a triangle wave or a sine wave.

7. The carbon dioxide gas shielded arc welding method according to claim 6, further comprising the step of causing the short circuit state, wherein said step of causing the short circuit state includes the step of performing constriction detection control of reducing a short circuit current when a constriction of a droplet is detected during the short circuit period.

8. The carbon dioxide gas shielded arc welding method according to claim 5, further comprising a step of causing the short circuit state, wherein said step of causing the short circuit state includes the step of performing constriction detection control of reducing a short circuit current when a constriction of a droplet is detected during the short circuit period.

* * * * *